US008649443B2

(12) United States Patent
Varadarajan et al.

(10) Patent No.: US 8,649,443 B2
(45) Date of Patent: Feb. 11, 2014

(54) OFDM-LITE ARCHITECTURE FOR HOMEPLUG (75) Inventors: Badri Varadarajan, Dallas, TX (US); Anand Dabak, Plano, TX (US); Shu Du, Richardson, TX (US); Il Han Kim, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 326 days.

(21) Appl. No.: 12/768,676

(22) Filed: Apr. 27, 2010

(65) Prior Publication Data
US 2010/0272192 A1 Oct. 28, 2010

Related U.S. Application Data (60) Provisional application No. 61/173,376, filed on Apr. 28, 2009, provisional application No. 61/174,774, filed on May 1, 2009, provisional application No. 61/228,029, filed on Jul. 23, 2009, provisional application No. 61/242,220, filed on Sep. 14, 2009.

(51) Int. Cl.
*H04L 25/00* (2006.01)
(52) U.S. Cl.
USPC ........................................................ 375/257
(58) Field of Classification Search
USPC .......... 370/319, 331, 474; 375/139, 222, 224, 375/227, 229, 257, 299, 316, 345; 709/250
See application file for complete search history.

(56) References Cited

U.S. PATENT DOCUMENTS

| 5,515,036 | A | * | 5/1996 | Waraksa et al. ............ 340/12.11 |
| 6,229,432 | B1 | * | 5/2001 | Fridley et al. ............. 340/12.35 |
| 6,373,377 | B1 | | 4/2002 | Sacca et al. |
| 7,199,706 | B2 | | 4/2007 | Dawson et al. |
| 7,277,511 | B2 | | 10/2007 | Langlais et al. |
| 7,283,566 | B2 | * | 10/2007 | Siemens et al. ............... 370/486 |
| 2007/0025266 | A1 | * | 2/2007 | Riedel et al. .................. 370/252 |

OTHER PUBLICATIONS

"HomePlug AV White Paper", Home Plug Powerline Alliance, Inc., HPAVWP-050818, 2005, pp. 1-11.

\* cited by examiner

*Primary Examiner* — Sam K Ahn
*Assistant Examiner* — Shawkat M Ali
(74) *Attorney, Agent, or Firm* — Steven A. Shaw; Wade James Brady, III; Frederick J. Telecky, Jr.

(57) ABSTRACT

A device for communicating digital data over power lines includes a power line interface for transmitting data over at least one band of frequencies. An orthogonal frequency division multiplexing (OFDM) modulation unit generates OFDM symbols using a set of tones for the frequency band. A preamble generation unit generates preamble sequences for the frequency band by using the set of tones used by the OFDM modulation unit. The tones used by the preamble generation unit have a constant magnitude, and a set of phases obtained by quantizing to a small alphabet the phase of a set of tones obtained by taking an IFFT of a portion of a preamble used by a non-interoperable powerline access device. The device may transmit on two or more bands using a sampling frequency clock, wherein a lower band clock frequency is equal to or an integer divisor of a higher band clock frequency.

18 Claims, 8 Drawing Sheets

OFDM-LITE ARCHITECTURE FOR HOMEPLUG

CLAIM OF PRIORITY UNDER 35 U.S.C. 119

The present application claims priority to and incorporates by reference U.S. Provisional Application No. 61/173,376, filed 2009 Apr. 28, entitled "OFDM-Lite Architecture for Homeplug Green PHY/MAC." The present application also claims priority to and incorporates by reference U.S. Provisional Application No. 61/174,774, filed 2009 May 1, entitled "Subband AV PHY/MAC Implementations." The present application also claims priority to and incorporates by reference U.S. Provisional Application No. 61/228,029, filed 2009 Jul. 23, entitled "Subband AV PHY/MAC Implementations." The present application also claims priority to and incorporates by reference U.S. Provisional Application No. 61/242,220, filed 2009 Sep. 14, entitled "Preamble for Homeplug (HPSE) Lowband PHY Option."

FIELD OF THE INVENTION

This invention generally relates to OFDM communication systems, and more specifically to HomePlug compatible systems for power line communication.

BACKGROUND OF THE INVENTION

The HomePlug Powerline Alliance was founded in 2000 to promote and standardize networking over power lines. This powerline networking trade association has developed successive specifications for both broadband applications such as HDTV and low-speed command and control applications such as home security. It has certified a large number of products from multiple vendors.

Due to problems with early powerline technology propagating signals effectively across electrical phases in a house, there is a perception that a powerline is an unreliable solution which only works in newer houses, or over short distances. This problem was effectively solved with HomePlug 1.0, and succeeding specifications such as HomePlug AV have made further improvements in whole home coverage.

Among other things, HomePlug allows the use of Ethernet in bus topology, which is very desirable in some circumstances. This is achieved by use of advanced orthogonal frequency division multiplex (OFDM) modulation that allows co-existence of several distinct data carriers in the same wire. The use of OFDM also allows turning off (masking) one or more of the sub-carriers which overlap previously allocated radio spectrum in a given geographic region. In North America, for instance, HomePlug AV only uses 917 of 1155 sub-carriers.

The HomePlug powerline alliance currently has defined the following specifications:

HomePlug 1.0—Released June 2001—Specification for connecting devices via power lines in the home. Theoretical speed of 14 Mbit/s.

HomePlug AV—Released December 2005—Designed for transmitting HDTV and VoIP around the home. Theoretical PHY data rate of up to 189 Mbit/s.[1]

HomePlug AV2—under development—Targets evolving home network requirements with usable throughput speeds up to 600 Mbps and more robust coverage.

HomePlug Access BPL (BPL)—under development—A working group to develop a specification for to-the-home connection.

HomePlug Command & Control (HPCC)—Released Oct. 9, 2007—It's a low-speed, very low-cost technology intended to complement the alliance's higher-speed powerline communications technologies. The specification enables advanced, whole-house control of lighting, appliances, climate control, security and other devices.

The HomePlug AV specification was designed to provide sufficient bandwidth for applications such as HDTV (high definition TV) and VoIP (voice over IP). Utilizing adaptive modulation on up to 1155 OFDM sub-carriers, turbo convolution codes for error correction, two-level MAC framing with ARQ, and other techniques, HomePlug AV can achieve near the theoretical maximum bandwidth across a given transmission path. Key distribution techniques and the use of 128 bit AES encryption are specified as mandatory in the specification. Furthermore, even the interception of encrypted data exchanged between HomePlug AV devices poses a "significant challenge" for an attacker due to the adaptive techniques used to modulate the signal between two given points.

In addition to the HomePlug family of standards, other power line communication standards exist, such as X10, G.hn, G.hnem (under development), etc. Various standards may not be interoperable. For example, HomePlug uses turbo coding forward error correction while G.hn is proposing low density parity check (LDPC). The two are incompatible and supporting both techniques would make HomePlug chips large and expensive. Differences in Forward error correction (FEC) are one of the reasons why HomePlug 1.0 devices do not interoperate with HomePlug AV devices. Though it is possible to build a backward-interoperable device, the complexity may be prohibitively expensive.

The Homeplug AV standard specifies PHY/MAC communication techniques over powerlines. Some key aspects of the specification are tabulated in Table 1.

TABLE 1

| Key Homeplug AV Parameters | |
|---|---|
| BAV Parameter | Value |
| Nominal sampling frequency | 75 MHz |
| FFT length | 3072 |
| Occupied carrier range | 74-1228, out of which 917 are used and the rest are "masked" |
| Length of preamble symbol | 3840 samples (51.2 us) |
| Number of header symbols | ½ |

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

HomePlug, along with other organizations such as CEPCA (Consumer Electronics Powerline Communication Alliance), UPA (Universal Powerline Association) and HD-PLC (High Definition Power Line Communication), are participating in developing the IEEE P1901 standard for powerline communications. P1901 defines a set of multiple non-interoperable PHY (physical layer) and MAC (media access control layer) specifications and a coexistence protocol between them. Although devices using different P1901 PHYs may not interoperate, they may coexist with each other.

There has been a recent proposal Homeplug AV-LR Gigle, Intellon, Arkados, Spidcom (Apr. 29, 2009) to reuse a low-rate version of the Homeplug AV standard for smart energy applications. The LR AV proposal aims to define a low-category AV device which is only capable of supporting the AV mini-ROBO mode (QPSK, rate ½ turbo code, 5× repetition in frequency) which yields a 3.8 Mbps data rate. While the solution relaxes specifications of some modules, it does not significantly reduce the cost, power consumption or complexity of the modem.

For a low power, low cost device that is compatible with HP AV, one aspect of interoperability, or coexistence (when interoperability is not possible), is in being able to recognize message preambles of another standard. Various configurations of preambles for use in a low power, low cost device are disclosed herein.

There is also a need for a subband AV PHY, which simplifies AV by only requiring operation on a sub-band of the whole AV bandwidth. Disclosed herein is an embodiment that retains the modulation structure of AV, while reducing the peak clock requirements, bandwidth of operation and analog front end requirements. Different variants of subband decoding are disclosed herein.

Figure 1:
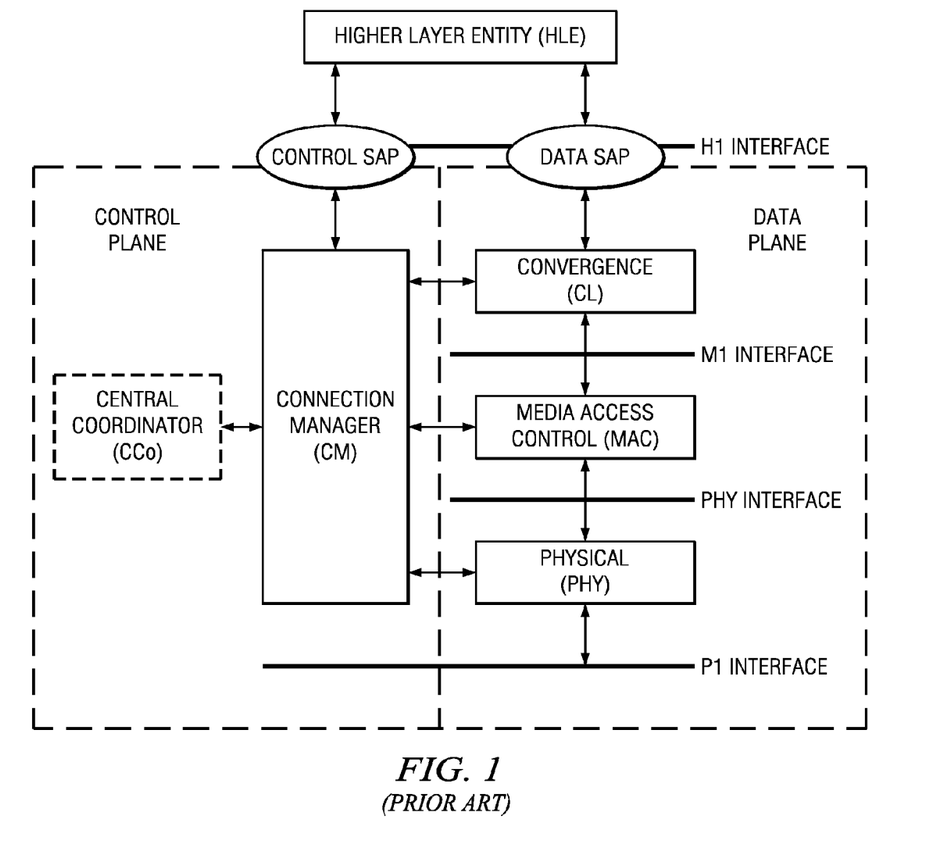
FIG. 1 is an architectural diagram of a prior art HPAV system, illustrating the PHY and MAC layers used for interoperability.

FIG. 1 shows an architectural diagram of a prior art HPAV system. The Higher Layer Entities (HLEs) above the H1 (Host) Interface may be bridges, applications or servers that provide off-chip services to clients below the H1 Interface. The Data Service Access Point (SAP) accepts Ethernet format packets, so all IP based protocols are easily handled. The Architecture defines two planes as shown in FIG. 1. The data plane provides the traditional layered approach with the M1 interface between the Convergence Layer (CL) and the MAC, and the PHY interface between the MAC and the PHY. In the control plane, the MAC is a monolith without conventional layering. In FIG. 1 it is labeled as the Connection Manager (CM) since that is its primary function. The approach adopted for the control plane was chosen to provide more efficient processing and to provide implementers greater flexibility for innovation. Although part of the control plane in all stations, the Central Coordinator (CCo) entity will be active in one and only one station in a single HPAV network.

The Physical Layer (PHY) operates in the frequency range of 2-28 MHz and provides a 200 Mbps PHY channel rate and a 150 Mbps information rate. It uses windowed OFDM and a powerful Turbo Convolution Code (TCC), which provides robust performance within 0.5 dB of Shannon Capacity. Windowed OFDM provides flexible spectrum notching capability where the notches can exceed 30 dB in depth without losing significant useful spectrum outside of the notch. Long OFDM symbols with 917 usable carriers (tones) are used in conjunction with a flexible guard interval. Modulation densities from BPSK (which carries 1 bit of information per carrier per symbol) to 1024 QAM (which carries 10 bits of information per carrier per symbol) are independently applied to each carrier based on the channel characteristics between the transmitter and the receiver.

HPAV provides connection-oriented Contention Free (CF) service based on periodic Time Division Multiple Access (TDMA) allocations of adequate duration to support the QoS requirements of a connection. HPAV also provides a connectionless, prioritized Contention based service to support both best-effort applications and applications that rely on prioritized QoS. This service is based on Collision Sense Multiple Access/Collision Avoidance (CSMA/CA) technology.

Figure 2:
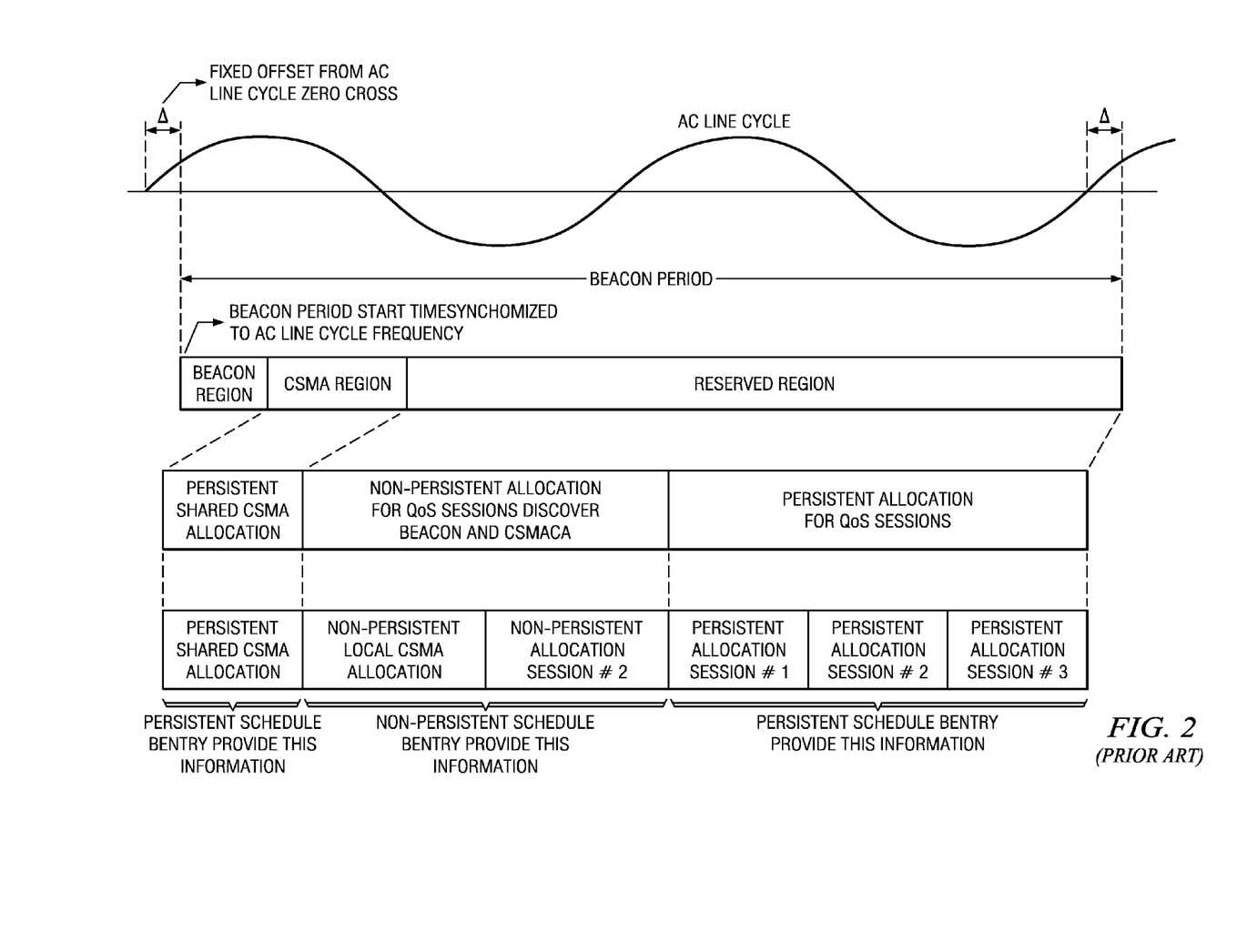
FIG. 2 is a prior art timeline illustrating regions of the beacon period.

To efficiently provide both kinds of communication service, HPAV implements a flexible, centrally-managed architecture. The central manager is called a Central Coordinator (CCo). The CCo establishes a Beacon Period and a schedule which accommodates both the Contention Free allocations and the time allotted for Contention-based traffic. As shown in FIG. 2, the Beacon Period is divided into 3 regions: beacon region, CSMA region, and contention-free region.

The CCo broadcasts a beacon at the beginning of each Beacon Period; it uses the beacon to communicate the scheduling within the beacon period. The beacons are extremely robust and reliable. The schedules advertised in the Beacon are persistent—i.e., the CCo promises not to change the schedule for a number of Beacon Periods—and the persistence is also advertised in the beacon so that the transmitting station for a connection can confidently transmit during its persistent allocation(s) even if it has missed several beacons within the advertised persistence of the schedule. This provides additional continuity even if a few beacons are missed. The CSMA periods are also persistent so that stations wishing to send CSMA traffic can do so even if they miss a few beacons.

If the CCo is able to accommodate the connection request, it will ask the stations to "sound" the channel. This allows the stations to perform the initial channel estimation (i.e., establish a Tone Map specifying the optimal modulation on each OFDM tone). The Tone Map is communicated from the receiver to the transmitter; the channel estimation is also communicated in abbreviated form to the CCo to help it determine how much time should be allocated to the connection. Based on the CSPEC and the channel sounding results, the CCo provides one or more persistent time allocations—Transmit Opportunities (TXOPs)—for the connection within the PCF Region.

The PCF Region also contains time for non-persistent allocations good only in the current beacon period. These non-persistent allocations are used to provide additional short term bandwidth to connections that require it (e.g., because of transient errors or changing channel conditions) to meet their QoS requirements, providing that the transmitting station hears the beacon at the beginning of the Beacon Period. When this time is not used for non-persistent CF allocations, in may be used for CSMA traffic. Again, stations must hear the beacon in order to know whether the time is available for CSMA traffic.

Messaging in HPAV is direct from station to station; however, the CCo monitors the messages. The header of each message contains information about how much data is pending for transmission on the connection; if this amount becomes large on a given connection, the CCo may allocate additional non-persistent time to the connection in the PCF Region. The Persistent CSMA Region provides prioritized contention-based communication. It is used where there is no CSPEC and/or the traffic is of short duration.

As shown in FIG. 2, the Beacon Period is synchronized to the AC line cycle. By synchronizing to the line cycle, HPAV provides stability of the periodic allocations relative to the line cycle. This, in turn, provides better channel adaptation to the synchronous (to the line cycle) interference, resulting in improved throughput. The beacon provides announcements of where the beacon will occur over the next few beacon periods—i.e., beacon persistence—to enable continued communications by stations that miss an occasional beacon.

Additional information on the operation of HP AV may be found in the HP AV standard document and in various articles, such as "HomePlug AV White Paper", 2005, Powerline Alliance, Inc.

As mentioned earlier, there is a need for a subband AV PHY, which simplifies AV by only requiring operation on a sub-band of the whole AV bandwidth. Disclosed herein is an embodiment that retains the modulation structure of AV, while reducing the peak clock requirements, bandwidth of operation and analog front end requirements. Different variants of subband decoding are disclosed.

Embodiments of the invention provide a subband AV PHY, which simplifies AV by only requiring operation on a sub-band of the whole AV bandwidth. These embodiments retain the modulation structure of AV, while reducing the peak clock requirements, bandwidth of operation and analog front end requirements. Different variants of subband decoding are disclosed.

Scaled AV

One embodiment simplifies AV by scaling down a combination of the sampling frequency, the FFT length and the number of active carriers. This can be done simply by scaling down its sampling frequency and FFT length and defining a new tone mask with fewer carriers. With a sampling frequency of Fs and an FFT length of N, note that the kth tone has frequency k*Fs/N. The tone spacing is Fs/N and the actual occupied band between 0 and Fs/2 (and a mirror image in the negative frequencies) is obtained by choosing the tone mask of active carriers (equally values of k where the IFFT input at the transmitter is non-zero.) Note that this generates a "low-band" mode of scaled AV, where the occupied band has lower frequency values than the original AV band of 2-30 MHz.

Note that other than the numerology, the PHY structure of AV is preserved, in terms of the PPDU structure: preamble, followed by header symbols and data. The same FEC as AV may be used. A different preamble sequence may be used.

Thus, the minimum set of changes from the PHY signal processing from AV to scaled AV are: (i) change the sampling frequency, (ii) change the number and location of active tones. In addition, some parameters in the FEC and preamble may change.

Two sets of exemplary embodiments are described below.

Low Band Scaled AV

In this embodiment, the sampling frequency and the tone spacing of AV are shifted downward. In addition, the FFT length may be scaled and a different tone mask may be chosen to fit regulatory constraints.

A few specific examples are presented below, which aim to move the AV band downward so that the 120-400 kHz band used by Homeplug C&C is occupied. Table 2 summarizes one embodiment, in which only the sampling frequency is scaled down while the FFT length is preserved.

TABLE 2 scaled sampling frequency

| Fs (MHz) | N | Tone Mask (List of active tones) |
|---|---|---|
| 75/30 = 2.5 MHz | 3072 | 120-401 |
| 75/24 = 3.125 MHz | 3072 | 118-394 |

Table 3 summarizes another set of embodiments that preserve the FFT length and the number of active tones (977) of AV. It must be pointed out that this second embodiment has the smaller tone spacing of 300 kHz, which could lead to intercarrier interference in the presence of sampling frequency offset.

TABLE 3 scaled sampling frequency

| Fs (MHz) | N | Tone Mask (List of active tones) |
|---|---|---|
| 75/80 = 0.9375 MHz | 3072 | 394-1300 |

Table 4 summarizes another set of embodiments in which the sampling frequency is scaled down with the FFT length adjusted.

TABLE 4 scaled sampling frequency and adjusted FFT length

| Fs (kHz) | N | Tone Mask (List of active tones) |
|---|---|---|
| 75000/75 = 1000 | 768 | 92-292 |
| 75000/50 = 1500 | 1024 | 82-273 |
| 75000/48 = 1562.5 | 1024 | 79-262 |
| 75000/72 = 1041.66667 | 512 | 59-197 |
| 75000/75 = 1000 | 512 | 61-195 |

High Band Scaled AV

In this embodiment, the original sampling frequency and tone spacing of AV are kept, but a smaller set of active tones is used. In effect, this amounts to using a smaller tone mask than in the AV standard. One exemplary band containing 128 active tones is as follows: High-band Scaled AV: Fs=75 MHz (same as AV), N=3072 (same as AV), and at least 128 contiguous active tones in AV. Other embodiments may use a different number of contiguous tones.

L1 Coexistence/Interoperability with HP AV

In this section, the coexistence of interoperability of scaled AV with the Homeplug AV standard is discussed. Some embodiments of AV, like low-band AV, do not share any part of the band with AV; so, from an L1 perspective, they seamlessly coexist without interference to or from Homeplug AV.

Embodiments which share a part of the band with Homeplug AV need to address both coexistence and interoperability issues, which will now be discussed one by one.

Subband Devices which do not Interoperate with AV

One class of subband-AV devices does not interoperate with Homeplug AV. They coexist with AV as follows. If the subband-AV device occupies a small number of AV tones within the AV band, they can transmit without significantly interrupting the performance of AV links in the vicinity. However, AV transmissions do occupy nearly the entire band of the subband-AV devices and could cause disruption in L1 performance.

The subband AV device may sense the AV preamble on a bandwidth BpreambleRx which may be larger than its own data bandwidth. This helps the subband AV device to accurately sense the preamble of AV devices in the vicinity. In one embodiment, BpreambleRx may equal the entire AV bandwidth.

In addition, it may receive the AV header on a bandwidth BheaderRx, which may be larger than its own data bandwidth. Note that the AV header contains significant frequency repetition. In order to receive at least one copy of all the coded header bits, the subband-AV device should receive at least 128 contiguous active AV tones. Of course, it may be possible to decode the header with fewer bits because of the rate ½ turbo code. Decoding the header would help the subband AV device to accurately sense the preamble of AV devices in the vicinity. In one embodiment, BpreambleRx may equal the entire AV bandwidth.

On the transmit side, the subband-AV device may also do a combination of the following:

It may transmit a preamble which is equivalent to the AV preamble on a band BpreambleTx which may be larger than its own data bandwidth. This helps AV devices to accurately sense the subband AV device. In one embodiment, BpreambleTx is equivalent to the entire AV bandwidth.

It may transmit a header which is equivalent to the AV header on a band BheaderTx which may be larger than its own data bandwidth. This helps AV devices to decode the header of the subband AV device. In one embodiment, BheaderTx is equivalent to the entire AV bandwidth.

In all these cases, after the preamble and header, the subband AV device may operate on a smaller set of tones for the data.

Subband Devices which Interoperate With AV

Figure 3:
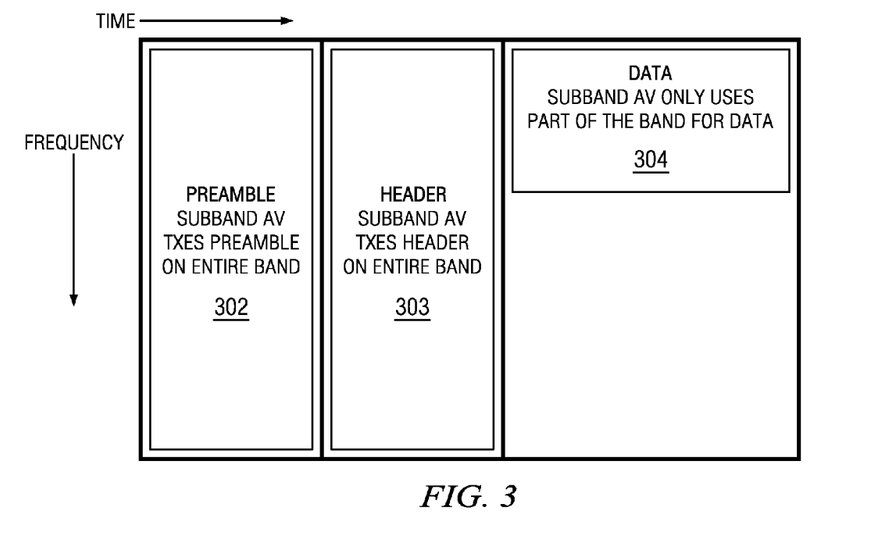
FIG. 3 is a frequency vs. time plot illustrating preamble, header and data transmission in a first mode of HP AV interoperable operation.

For subband devices to interoperate with AV, one of the following three modes may be used. FIG. 3 is a frequency vs. time plot illustrating preamble, header and data transmission in a first mode of HP AV interoperable operation In this first mode, a subband device transmits and receives preamble 302 and header 303 over the entire data bandwidth. Data transmissions 304 can only happen on a subband. This can potentially be supported without change to AV systems by simply defining a smaller tone map for communication between AV and subband devices. The disadvantage is that the subband AV device has to have an analog front end which can support transmission and reception over the entire bandwidth.

Figure 4:
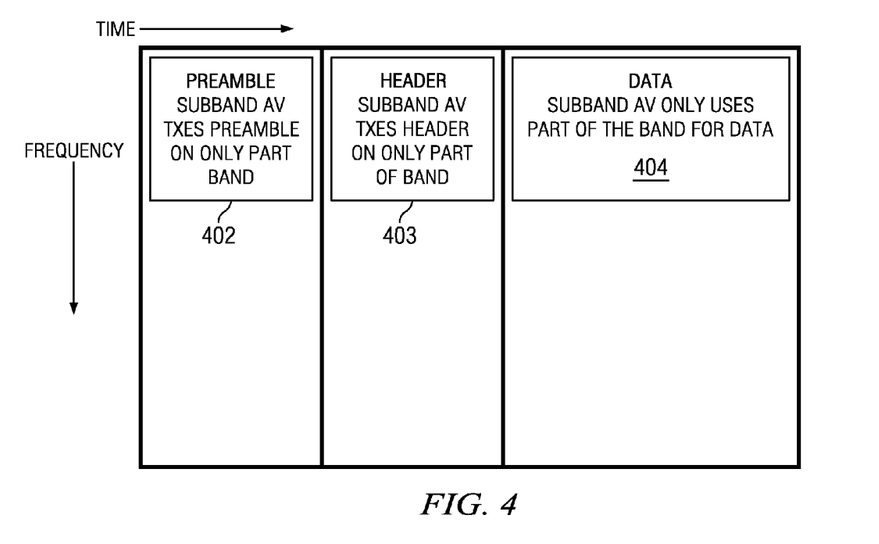
FIG. 4 is a frequency vs. time plot illustrating preamble, header and data transmission in a second mode of HP AV interoperable operation.

FIG. 4 is a frequency vs. time plot illustrating preamble, header and data transmission in a second mode of HP AV interoperable operation. In this second mode, the subband AV device transmits and receives preamble 402 and header 403 over only a fraction of the entire data bandwidth. Data transmissions 404 are also performed on a subband. AV devices will need to detect this subband-preamble and decode the subband-header. This option is preferable from the point of the subband-AV analog front end design, but would involve change to AV.

A third possibility is to have two classes of subband AV devices. One class can send preamble and header over the entire bandwidth and thus "bridge" the AV network to the subband AV network. This bridging can be either for data or for some control messages or both.

In this disclosure, simplifications to the Homeplug AV are described to enable a lower cost interoperable device to operate only on a subband of the entire AV bandwidth. In one embodiment, the AV transmit and receive algorithms are maintained but the sampling clock and numerology are changed to move the link to a different bandwidth. In another embodiment, subband AV devices share a portion of the AV band. Table 5 lists several exemplary numerologies, but is not intended to be an exclusive list.

TABLE 5

Exemplary Numerology for HP AV Interoperable low cost device

| Fs (kHz) | FFT Length | Tone Mask (List of active tones) | CP Length | Divide ratio with 50 MHz Clock | Divide ratio with 75 MHz Clock | Ratio to PRIME carrier spacing | Fc/Fs | No. of Symbols in 50 Hz Cycle | No. of Symbols in 60 Hz Cycle | No. of active tones | BW occupied (kHz) |
|---|---|---|---|---|---|---|---|---|---|---|---|
| 1000 | 768 | 92-292 | 65 samples (65 us) | 50 | 75 | 2.67 | 0.25 | 24.01 | 20.01 | 201 | 260.42 |
| 1500 | 1024 | 82-273 | 226 samples (150.67 us) | 33.3 | 50 | 3 | 0.17 | 24 | 20 | 192 | 279.79 |
| 1562.5 | 1024 | 79-262 | 17 samples (10.9 us) | 32 | 48 | 3.125 | 0.167 | 30.02 | 25.02 | 184 | 279.24 |
| 1041.7 | 512 | 59-197 | 66 samples (63.36 us) | 48 | 72 | 4.167 | 0.25 | 36.04 | 30.04 | 139 | 280.76 |
| 1000 | 512 | 61-195 | 43 samples (43 us) | 50 | 75 | 4 | 0.25 | 36.04 | 30.03 | 135 | 261.72 |

As mentioned earlier, for a low power, low cost device that is compatible with HP AV, one aspect of interoperability, or coexistence when interoperability is not possible, is in being able to recognize message preambles of another standard. Various configurations of preambles for use in a low power, low cost device will now be described. For reference, this low cost device will be referred to as an HPSE device.

Embodiments of the invention include a preamble sequence for the low-band option of the HPSE PHY. The choice for the preamble breaks down into the choice of the preamble sequence length, and the chosen sequence itself. The following qualities are desirable in the chosen preamble sequence:

Constant-modulus Frequency-domain structure similar to Homeplug AV-LR (low rate)

Low peak-to-average ratio in time domain: This permits boosting of the preamble to improve synchronization performance High correlation with Homeplug C&C (command and control) symbol: This property ensures coexistence with C&C A sequence that satisfies the above requirements will now be disclosed.

Preamble Sequence Length

The required preamble sequence length is determined by the minimum SNR supported by the standard. The lower the target SNR (signal to noise ratio), the longer the preamble sequence needs to be. The following considerations are relevant in the choice of minimum SNR. First, the minimum spectral efficiency targeted is 0.1. The Shannon limit for this spectral efficiency is −11.4 dB. Assuming a gap-to-capacity of 5 dB, the SNR of operation needs to be about −6 dB for data decoding. Correspondingly, the target SNR for sync is set to be 2 dB lower, at −8 dB. Secondly, in the Homeplug C&C specification, the target SNR of sync is −8 dB and for data reception is −5 dB. At −8 dB, the C&C specification calls for 1e-5 probability of false alarm and 1% probability of miss.

Based on the above considerations, a target SNR for preamble detection is set to −8 dB, for an AWGN channel. For this SNR, the preamble detection performance for various lengths is shown in FIG. 3. In this simulation, the receiver computes the normalized correlation of the received signal with the preamble sequence, windowed over five samples to account for multipath, and thresholds it. FIG. 3 shows the probabilities of false alarm and missed detection versus the detection threshold, for various preamble lengths. Probability curves 301-202 denote probabilities of false alarm (as the threshold increases, the probability of false alarm decreases, as expected), and probability curves 304-306 denote probability of miss. As expected, there is a trade-off between the two.

Figure 5:
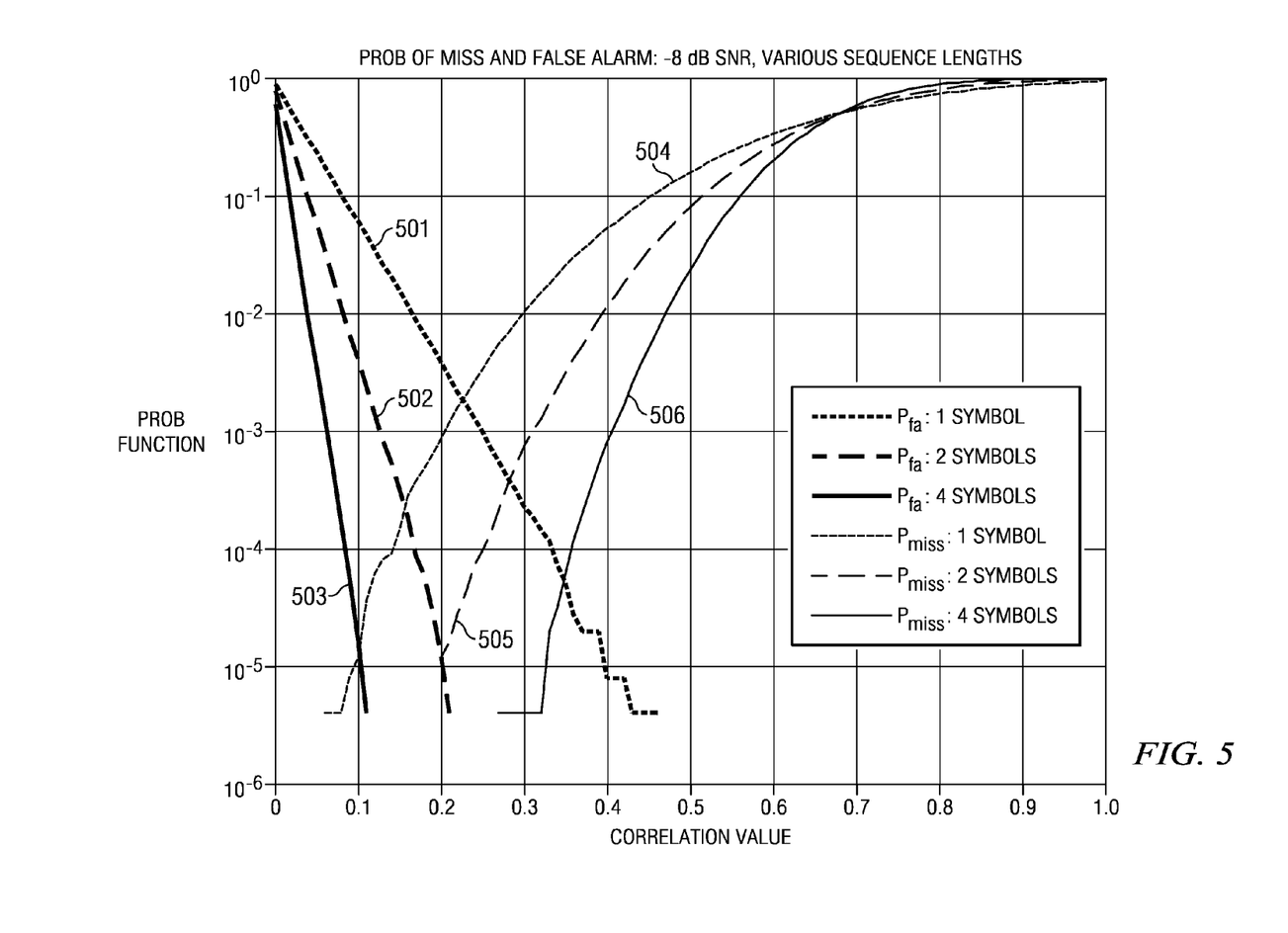
FIG. 5 is a plot illustrating simulated preamble detection performance for different preamble lengths.

FIG. 5 is a plot illustrating simulated preamble detection performance for different preamble lengths. Curves 501, 504 show P_fa and P_miss for a preamble of length one OFDM symbol (512 samples at 1.25 MHz, corresponding to 409.6 us). If a preamble of length one symbol is chosen, the P_fa can only be made 1e-5 if a 7% probability of miss is tolerated. However, if the preamble length is increased to two symbols, the desired (1e-5, 1e-2) combination of P_fa and P_miss can be achieved as illustrated by curves 502, 505. Curves 503, 506 P_fa and P_miss for a preamble of length three OFDM symbols. To minimize overhead, a preamble of length two OFDM symbols (819.2 us) is selected.

Preamble Sequence Choice

Given the selected length of two of the preamble sequence, the choice of an actual sequence will now be discussed. For convenience in notation, the 2-symbol preamble sequence is denoted as $\{p_0^0, p_1^0, \ldots, p_{511}^0, p_0^1, p_1^1, \ldots, p_{511}^1\}$. Thus, the first 512 samples belong to symbol 0 and the next 512 belong to symbol 1.

As stated earlier, the following properties are considered desirable:

1. Constant-modulus Frequency-domain structure similar to Homeplug AV-LR. Thus, denoting the length-512 FFT of the preamble $\{p_l^s\}$ as $\{P_k^s\}$, it is desirable to ensure that $\{P_k^s\}$ is non-zero only in the signal band of 120-380 kHz, and has constant modulus in the rest of band. In other words, $$P_k^s = 0 \text{ for } 0 \leq k < 50$$
$$= \exp(j\varphi_k^s) \text{ for } 50 \leq k \leq 156$$
$$= 0 \text{ for } 156 < k \leq 255$$

2. Low peak-to-average ratio in time domain: This permits boosting of the preamble to improve synchronization performance. Since peak-to-average ratio by itself is a misleading measure of "signal flatness", the cubic metric of the symbol is minimized, or equivalently:

$$=\text{avg}(|p_l|^6)/(\text{avg}(|p_l|^2))^3.$$

3. High correlation with Homeplug C&C symbol: As mentioned earlier, it is desirable to ensure high correlation with Homeplug C&C symbol to ensure seamless coexistence. Thus, HPSE and HP C&C devices will be able to detect each other's preambles/symbols.

4. Ease of implementation: To limit the complexity of correlation, Homeplug AV uses a single preamble sequence of length one symbol, which is repeated to ensure near-optimum performance. Following the same method, for HPSE repeats one symbol. Thus, in the above notation $$p_l^0 = p_l^1 = p_l \text{ for } l=0,1,\ldots,511.$$

A sequence $\{p_l^0\}$ that satisfies the first three properties will now be described. To ensure high cross-correlation with the C&C symbol, the following procedure is followed. The HP C&C symbol is resampled at 1.25 MHz. The resulting sequence has a length of 1000 samples. Each length-512 snapshot of this sequence is fed into an FFT yielding a frequency domain sequence $F_k$. Now, for carriers from 50, ..., 156, the angle $\theta_k^s$ is set to be the quantized angle of $F_k$, in steps of $(\pi/4)$. The magnitude information of $F_k$ is ignored. The resulting cubic metric was calculated for various length-512 snapshots from the HP C&C symbol, a shift that yielded a low cubic metric was chosen. The corresponding phase is tabulated in Table 6, where the phase angle number refers to $\phi_k/(\pi/4)$.

TABLE 6

| Phase angles for HP C&C compatible preamble | |
|---|---|
| 512-IFFT carrier number | Phase Angle Number |
| 50 | 6 |
| 51 | 5 |
| 52 | 5 |
| 53 | 4 |
| 54 | 6 |
| 55 | 4 |
| 56 | 5 |
| 57 | 2 |
| 58 | 6 |

TABLE 6-continued

Phase angles for HP C&C compatible preamble

| 512-IFFT carrier number | Phase Angle Number |
|---|---|
| 59 | 7 |
| 60 | 6 |
| 61 | 7 |
| 62 | 7 |
| 63 | 7 |
| 64 | 5 |
| 65 | 0 |
| 66 | 4 |
| 67 | 6 |
| 68 | 2 |
| 69 | 1 |
| 70 | 0 |
| 71 | 5 |
| 72 | 5 |
| 73 | 6 |
| 74 | 7 |
| 75 | 4 |
| 76 | 1 |
| 77 | 2 |
| 78 | 5 |
| 79 | 0 |
| 80 | 2 |
| 81 | 6 |
| 82 | 3 |
| 83 | 3 |
| 84 | 1 |
| 85 | 5 |
| 86 | 0 |
| 87 | 3 |
| 88 | 6 |
| 89 | 1 |
| 90 | 3 |
| 91 | 6 |
| 92 | 2 |
| 93 | 3 |
| 94 | 0 |
| 95 | 6 |
| 96 | 3 |
| 97 | 1 |
| 98 | 6 |
| 99 | 2 |
| 100 | 2 |
| 101 | 5 |
| 102 | 0 |
| 103 | 0 |
| 104 | 6 |
| 105 | 5 |
| 106 | 2 |
| 107 | 0 |
| 108 | 4 |
| 109 | 0 |
| 110 | 7 |
| 111 | 3 |
| 112 | 0 |
| 113 | 6 |
| 114 | 3 |
| 115 | 7 |
| 116 | 6 |
| 117 | 0 |
| 118 | 6 |
| 119 | 4 |
| 120 | 7 |
| 121 | 3 |
| 122 | 2 |
| 123 | 4 |
| 124 | 5 |
| 125 | 7 |
| 126 | 0 |
| 127 | 6 |
| 128 | 5 |
| 129 | 1 |
| 130 | 3 |
| 131 | 2 |
| 132 | 6 |
| 133 | 4 |
| 134 | 7 |
| 135 | 3 |
| 136 | 1 |
| 137 | 1 |
| 138 | 1 |
| 139 | 3 |
| 140 | 4 |
| 141 | 5 |
| 142 | 1 |
| 143 | 0 |
| 144 | 1 |
| 145 | 7 |
| 146 | 6 |
| 147 | 0 |
| 148 | 1 |
| 149 | 1 |
| 150 | 3 |
| 151 | 6 |
| 152 | 5 |
| 153 | 5 |
| 154 | 3 |
| 155 | 1 |
| 156 | 5 |

Figure 6:
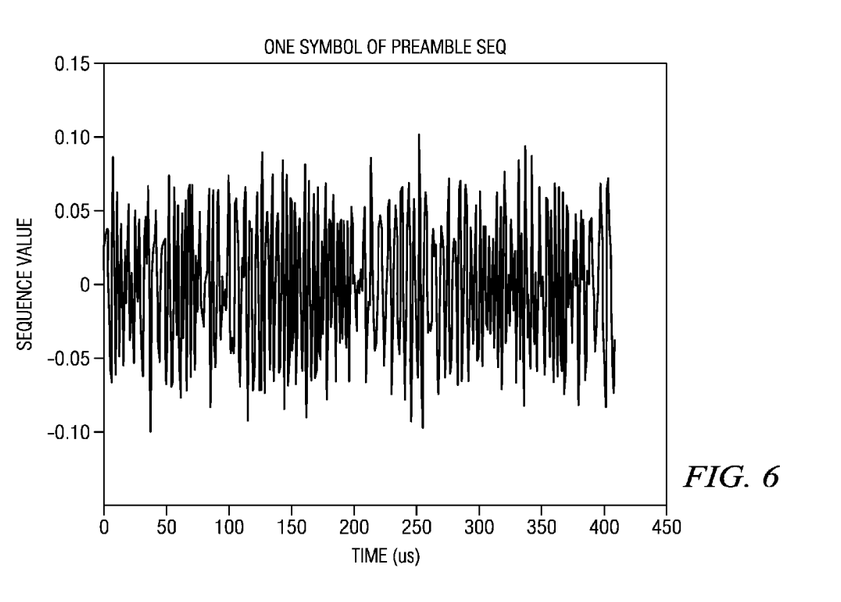
FIG. 6 is a time domain plot of a one symbol of a preamble sequence that correlates well with a HP C&C preamble.
Figure 7:
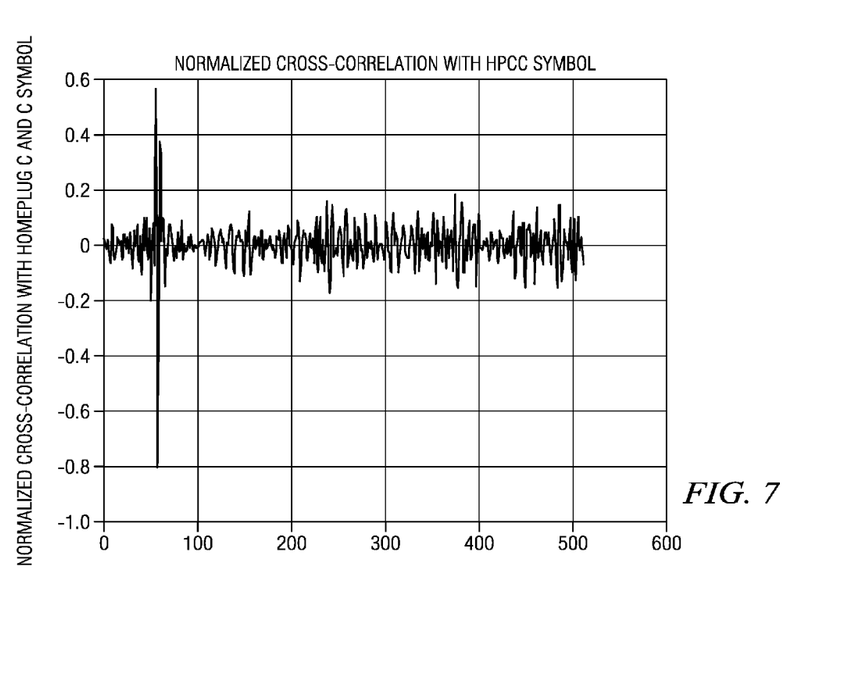
FIG. 7 is a plot illustrating normalized cross-correlation against an HP C&C preamble sequence.

The length-512 sequence $\{p_l\}$ is obtained as the real part of IFFT($\{P_k\}$), as defined above. A plot of the corresponding time-domain sequence is shown in FIG. 6 which shows one symbol of the preamble sequence. As expected, the sequence was found to have high cross-correlation with the HP C&C symbol, as shown in FIG. 7. Note that the normalized cross-correlation is as high as 0.84 at the max offset. The cubic metric of this time domain sequence was evaluated to be 3.75 dB. In comparison, the cubic metric of the OFDM payload is 6.5 dB.

Figure 8:
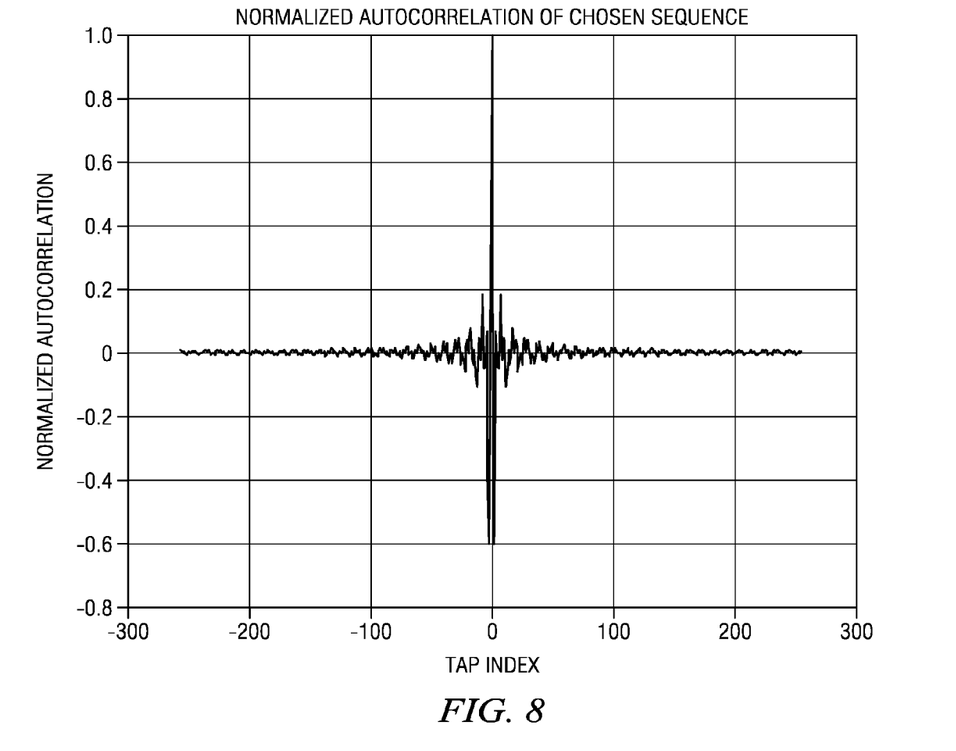
FIG. 8 is a plot illustrating autocorrelation of the HPSE and HP C&C preambles.

FIG. 8 is a plot illustrating autocorrelation of the HPSE and HP C&C preambles. The autocorrelation of the sequence, as seen in FIG. 8, is close to an impulse.

Figure 9:
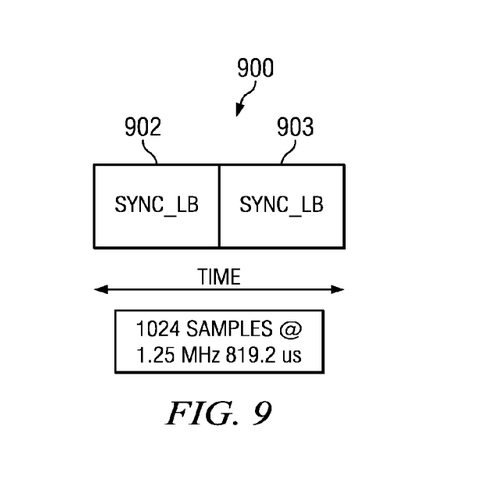
FIG. 9 is timeline illustration of the HP SE preamble.

FIG. 9 is timeline illustration of the HP SE-LB (low band) preamble 900 that includes two identical symbols 902, 903. The time domain waveform elements of the extended Preamble structure of each symbol in FIG. 9 are defined as:

$$S_{SYNC\_LB}[n] = \frac{1}{\sqrt{512}} \cdot \sum_{c \in C_M} \cos\left(\frac{2 \cdot \pi \cdot c \cdot n}{512} + \phi(c)\right) \text{ for } 0 \le n \le 512 - 1$$

where $C_M$ is the set of all active carries in the Homeplug SE-LB, and the angle (c) denotes the phase angle number defined in Table multiplied by $\pi/4$. An additional scaling factor may be defined.

Therefore, the entire extended Preamble waveform 700, $S_{PreambleExt}$ is given by:

$$S_{Preamble\_LB}[n] = S_{SYNC\_LB}[(n) \bmod 512] \text{ for } 0 \le n \le 2 \cdot 512 - 1$$

Figure 10:
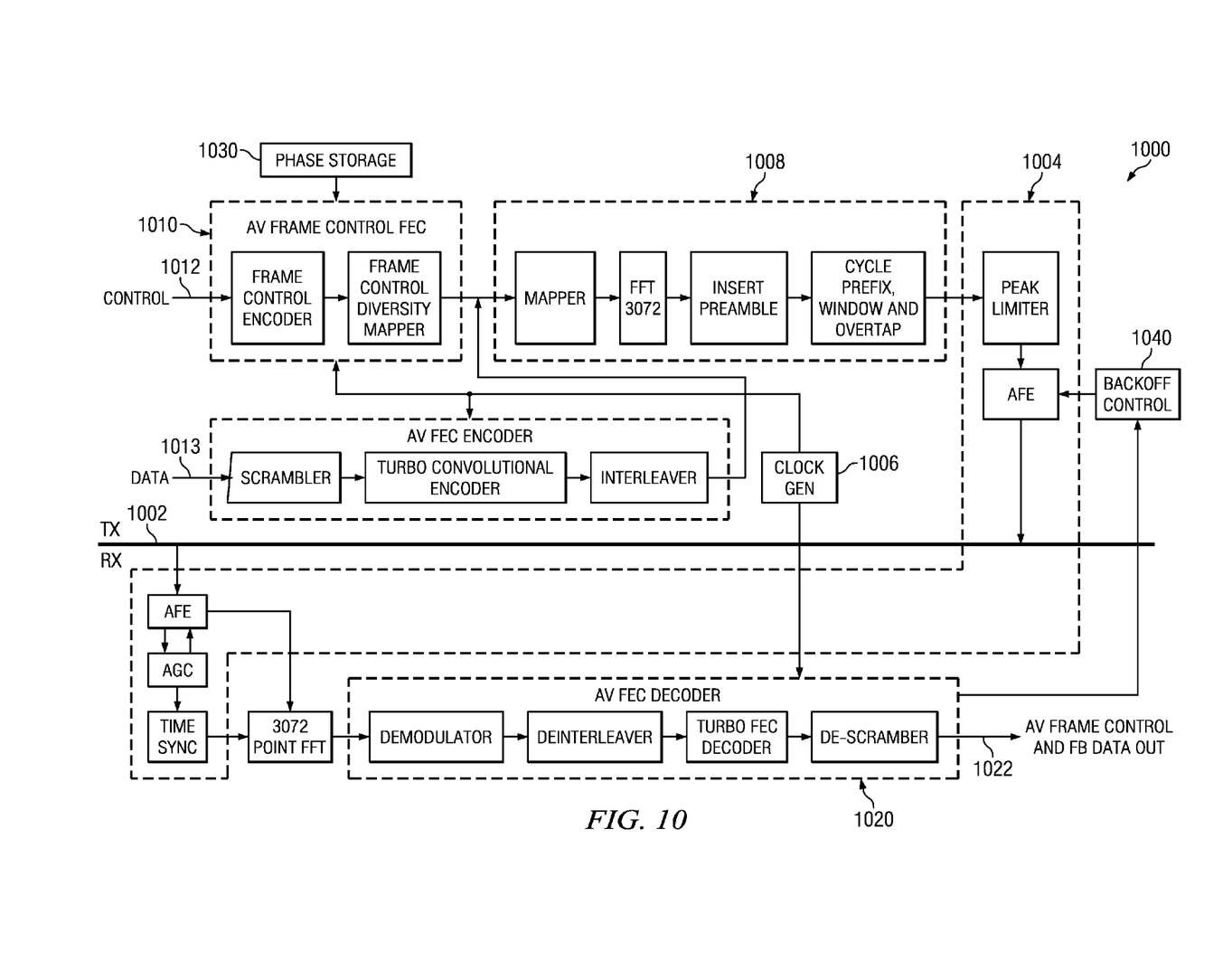
FIG. 10 is a block diagram of an exemplary low cost, low power HP AV interoperable device.

FIG. 10 is a block diagram illustrating an exemplary low cost, low power device 1000 that is compatible and interoperable with HP AV. This embodiment is referred to herein as Multi-Carrier-Lite (MC-Lite) The MC-Lite device includes a power line interface 1004 for transmitting data over one or more of a low band and a high band of frequencies onto power line 1002. Power line 1002 is representative of typical power wiring in residential and commercial buildings, usually providing 110 VAC or 220 VAC, 60 cycle. European or Asian applications will have power systems that have voltage levels and frequencies that may differ from these values. Clock generation unit 1006 is configured to generate a sampling frequency clock, in which a lower band clock frequency is equal to or an integer divisor of a higher band clock frequency, as discussed with regard to Tables 2-5. An orthogonal frequency division multiplexing (OFDM) modulation unit 1008 is configured to generate OFDM symbols using a set of tones for the one or more bands. A preamble generation unit 1010 is configured to generate preamble sequences for the one or more bands using one or more of the sampling frequency clocks. A preamble detection unit 1020 is configured to detect preamble sequences for the one or more bands using one or more of the sampling frequency clocks.

On the transmitter side (TX), the PHY layer receives its inputs from the Medium Access Control (MAC) layer. There are separate inputs for data 1013, and control information 1012. The control information is processed by the Frame Control Encoder block 1010, which has an embedded Frame Control FEC (forward error control) block and Diversity Interleaver. The data stream 1013 passes through a Scrambler, a Turbo FEC Encoder and an Interleaver. The outputs of the two streams lead into a common OFDM Modulation structure 1008, consisting of a Mapper, an IFFT processor, Preamble and Cyclic prefix insertion and a Peak Limiter. This output eventually feeds the Analog Front End (AFE) module 1004 which couples the signal to the Powerline medium 1002.

At the receiver, an AFE operates in conjunction with an Automatic Gain Controller (AGC) and a time synchronization module to feed separate data information and data recovery circuits. The HPAV Frame Control is recovered by processing the received stream through a 3072-point FFT, a Frame Control Demodulator and a Frame Control Decoder. The data stream is retrieved after processing through a 3072-point FFT for HPAV, a demodulator with SNR estimation, a De-mapper, De-interleaver, Turbo FEC decoder, and a De-scrambler for HPAV data. If the device is intended to be interoperable with HP 1.0, then there is also a HP 1.0 Frame Control module for recovering HP 1.0 preambles using a 384-point FFT.

The HPAV PHY provides for the implementation of flexible spectrum policy mechanisms to allow for adaptation in varying geographic, network and regulatory environments. Frequency notches can be applied easily and dynamically, even in deployed devices. Region-specific keep-out regions can be set under software control. The ability to make soft changes to alter the device's tone mask (enabled tones) allows for implementations that can dynamically adapt their keep-out regions.

Thus, MC-Lite device 1000 is embodied by modifying existing HomePlug standards as little as possible and is also compatible with Zigbee, which is based on IEEE 802.15.4. Minor tweaks are made to the HP AV MAC layer. The embodiment focuses on a low power, low cost, non-invasive green PHY layer. It maintains security using 128-bit AES encryption, the same as AV. It provides low latency and supports HAN (home area network) applications, including remote management. It supports IEEE 802.2 compliant MAC bridging with HP AV devices. Table 7 summarizes the main PHY layer characteristics of the low power device.

TABLE 7

| Numerology for low power device | |
| --- | --- |
| Low Band PHY | High Band PHY |
| Occupied Band: 120-400 kHz | Center = 2.412 MHz, BW = 167.7 kHz |
| Data Rate: 20-350 Kbps | Data Rate: 12-350 Kbps |
| Preamble same as HP C&C symbol, so Non-invasive coexistence with HP C&C | Only occupies 7 HPAV carriers, ensuring Non-invasive coexistence with HP AV |
| Reference Fsamp = 959.4 KHz | Reference Fsamp = 241.2 KHz |
| 300 active tones in band | 178 active tones in band |

Windowed multicarrier modulation
Simplified HP 1.0 FEC: Outer Reed Solomon Code (t = 3), with inner conv code (K = 5)
DBPSK/DQPSK/D-8PSK modulation
Symbol periods are synchronized to AC mains (50/60 Hz), enabling avoidance of mains synchronous noise The MC-Lite device has a data rate range ~12 kbps-350 kbps. Link adaption allows the device to match channel conditions. Data rate targets are achieved with low order modulation. Data rates may be easily scalable upwards if future applications require it by increasing the modulation order. An efficient, high-performance concatenated FEC (forward error correction) architecture used. A t=3 Reed Solomon code outer code, rate $9/15$ to $249/255$ is used. A K=5 inner convolution code, rate $½$ to $¾$ (by puncturing) is used.

The encoder architecture is similar to HP1.0, but simplified to save power/cost. The device supports low spectral efficiency (7.5%) mode to cover bad channel conditions. ROBO mode is used with 2× or 4× repetition, but only used with lowest code rates.

Figure 11:
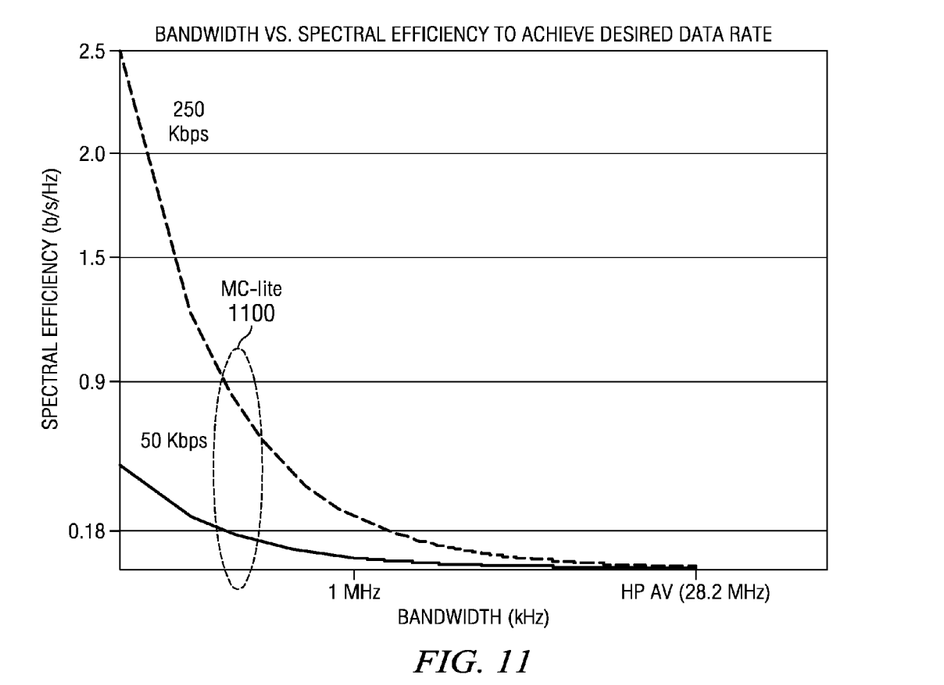
FIG. 11 is a plot of spectral frequency vs. bandwidth.

FIG. 11 is a plot of spectral frequency vs. bandwidth. For the MC-Lite device of FIG. 10, the operating bandwidth is indicated at 1100. The bandwidth is chosen to achieve target data rates with 0.2-0.9 spectral efficiency. This well-tuned choice enables low power, low cost solutions. As can be seen, for a same data rate, power consumption increases with bandwidth. For the MC-lite embodiment, tx power consumption is 100 mW (low band), 10 mW (high band). Tx power is measured with 50 uH/50 ohm load restricted by allowed limits: 20 mW (low band), 1.7 mW (highband)

The Low-band architecture shares the 120-400 kHz band with HP C&C. As mentioned earlier, the HP C&C technology does not allow exchanged of data between HP C&C devices and HP AV compatible devices, including the MC-Lite embodiment. In this case, the HP C&C device is a "non-interoperable device" from the viewpoint of the MC-Lite device. Coexistence is enabled by making preamble include the symbol used in HP C&C, as described in more detail with regard to FIGS. 3-7. The MC-Lite preamble generation unit generates a preamble sequences for the low band using the sampling frequency clock. The preamble generation unit generates a portion of the preamble by using a set of tones used by the OFDM modulation unit 1008. The tones used by the preamble generation unit have a constant magnitude, and a set of phases obtained by quantizing to a small alphabet the phase of a set of tones obtained by taking an IFFT of a portion of a preamble used by a non-interoperable powerline access device. The set of phases may be determined ahead of time and stored in a table or other form in a memory device 1030 within device 1000, referring again to FIG. 10. The contents of the phase storage module may be similar to Table 2, for example. HP C&C devices sense the C&C symbol in the preamble, and then execute CSMA backoff. The MC-Lite device senses HP C&C preamble, and then postpones transmission under control of backoff control unit 1040.

Figure 12:
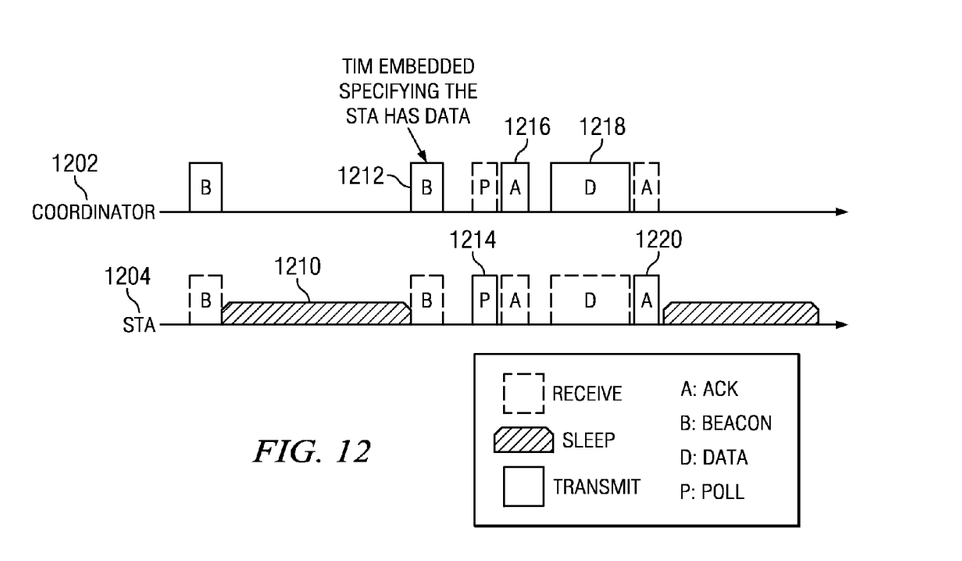
FIG. 12 is a timeline illustrating operation of a power saving feature in the device of FIG. 10.

FIG. 12 is a timeline illustrating operation of a power saving feature in the MC-Lite device of FIG. 10. While embodied in the MC-Lite device, the power saving feature described herein may be embodied by almost any HomePlug compatible powerline device Network-wide power saving mechanism can be done by autonomously placing a powerline device in a low power sleep mode between beacon signals when the device has no data to transmit or receive. Referring again to FIG. 1, a central coordinator (CCo) in a powerline system controls data transfers. It also sends beacon signals as indicated in FIG. 2. Referring again to FIG. 12, the beacon signals B are sent by central coordinator 1202. The various device, or stations (STA) 1202 monitor the beacon signals in order to maintain synchronization. All nodes except the central coordinator may go to sleep mode and only wake up for beacons. The Coordinator 1202 buffers the data for the nodes that are in the sleep mode. Beacons use a Traffic Indication Map (TIM) to notify the sleeping node about the buffered data.

For example, station 1204 is in sleep mode 1210 between two beacon signals. When coordinator 1202 has data to send to station 1204, this information is embedded in beacon signal 1212 in the form of a TIM. Station 1204 wakes up for each beacon signal and determines if there is a TIM for it. In response to the TIM in beacon signal 1212, station 1204 will then use a polling frame 1214 to retrieve buffered data. In response, coordinator 1202 sends acknowledge frame 1216 and then data 1218 that is received by station 1204 and acknowledged 1220. Station 1204 may process the data and then go back to sleep and wait for the next beacon signal.

Other Embodiments

In the description herein, some terminology is used that is specifically defined in the HomePlug coding standard and/or is well understood by those of ordinary skill in the art in HomePlug technology. Definitions of these terms are not provided in the interest of brevity. Further, this terminology is used for convenience of explanation and should not be considered as limiting embodiments of the invention to the HP AV standard. One of ordinary skill in the art will appreciate that different terminology may be used in other encoding standards without departing from the described functionality.

Embodiments of the decoders/encoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the signal processing.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A device for communicating digital data over power lines, the device comprising: a power line interface for transmitting data over one or more of a low band of frequencies and a high band of frequencies; a clock generation unit configured to generate a plurality of scaled sampling frequency clocks; an orthogonal frequency division multiplexing (OFDM) modulation unit configured to generate OFDM symbols using a set of tones for the one or more bands of frequencies; a preamble generation unit configured to generate a plurality of preamble sequences for the one or more bands of frequencies using one or more of the scaled sampling frequency clocks; a preamble detection unit to configured detect one or more preamble sequences for the one or more bands of frequencies using one or more of the scaled sampling frequency clocks; and a backoff unit coupled to the preamble detection unit and to the power line interface, wherein the preamble detection unit is configured to detect a preamble sequence that is generated by a non-interoperable device, wherein the non-interoperable device cannot demodulate the OFDM symbols generated by the device, wherein the backoff unit is configured to cause postponement of data transmission by the power line interface when the preamble detection unit detects a preamble from the non-interoperable device.

2. The device of claim 1, wherein the OFDM modulation unit is configured to form OFDM symbols using a data sampling frequency Fs/m, where m is an integer, and Fs is a data sampling frequency used by other devices coupled to the power lines.

3. The device of claim 1, wherein the set of tones used for the lower band of frequencies is a subset of the set of tones used for the high band of frequencies.

4. The device of claim 1, wherein the preamble sequence for the lower band of frequencies occupies a subset of the set of tones occupied by the preamble sequence of the high band of frequencies.

5. The device of claim 1, wherein the preamble sequence detection unit is configured to detect more preamble sequences than generated by the preamble sequence generation unit.

6. The device of claim 1, wherein the preamble detection unit is configured to detect a preamble in the high band of frequencies and the OFDM generation unit only generates OFDM symbols for the low band of frequencies.

7. The device of claim 1, wherein the device further comprises a power control module that is configured to place the device in sleep mode; and
wherein the power line interface is configured to receive a periodic beacon signal while the device is in sleep mode, such that when the beacon signal contains an indication of data available, the power control module is configured to awaken the device so that the device is operable to receive the data.

8. A device for communicating digital data over power lines, the device comprising: a power line interface for transmitting data over at least one band of frequencies; a clock generation unit configured to generate a sampling frequency clock for the at least one band; an orthogonal frequency division multiplexing (OFDM) modulation unit configured to generate OFDM symbols using a set of tones for the at least one band; and a preamble generation unit configured to generate a plurality of preamble sequences for the at least one band using the sampling frequency clock, wherein the preamble generation unit generates a portion of the preamble by using the set of tones used by the OFDM modulation unit; wherein the tones used by the preamble generation unit have a constant magnitude, and a set of phases obtained by quantizing to a small alphabet a phase of a set of tones obtained by taking an inverse fast Fourier transform (IFFT) of a portion of a preamble used by a non-interoperable powerline access device; and postponing data transmission by the device when a preamble from a non-interoperable device is detected, wherein generating the preamble sequence by the device for the low band forms a preamble that is similar to a preamble generated by the non-interoperable device, such that the preamble detection unit is operable to detect a preamble from another interoperable device and also from the non-interoperable device.

9. The device of claim 8, wherein the non-interoperable powerline access technology is Homeplug C & C, and the small alphabet of phases is $(\pi/4)*k$ radians, where k=0, 1, 2, 3, 4, 5, 6, 7.

10. A device for communicating digital data over power lines, the device comprising: a power line interface for transmitting data over at least one band of frequencies; a clock generation unit configured to generate a sampling frequency clock for the at least one band of frequencies; an orthogonal frequency division multiplexing (OFDM) modulation unit configured to generate OFDM symbols using a set of tones for the at least one band of frequencies; a preamble generation unit configured to generate a plurality of preamble sequences for the at least one band of frequencies using the sampling frequency clock, wherein the preamble generation unit generates a portion of the preamble by using the set of tones used by the OFDM modulation unit; wherein the tones used by the preamble generation unit have a constant magnitude, and a set of phases obtained by quantizing to a small alphabet a phase of a set of tones obtained by taking an inverse fast Fourier transform (IFFT) of a portion of a preamble used by a non-interoperable powerline access device; a preamble detection unit configured to detect one or more preamble sequences for the at least one band; an OFDM demodulation unit configured to recover data from the OFDM symbols using a set of tones for the at least one band; and a backoff unit coupled to the preamble detection unit and to the power line interface, wherein the preamble detection unit is configured to detect a preamble sequence that is generated by a non-interoperable device, wherein the non-interoperable device cannot demodulate the OFDM symbols generated by the device, wherein the backoff unit is configured to cause postponement of data transmission by the power line interface when the preamble detection unit detects a preamble from the non-interoperable device.

11. A method for communicating digital data over power lines, the method comprising: generating a sampling frequency clock within a device coupled to the power lines, wherein a lower band sampling frequency clock has a sampling frequency Fs equal to or an integer divisor of a higher band sampling frequency clock; generating orthogonal frequency division multiplexing (OFDM) symbols within the device using a set of tones for one or more of a low band of frequencies and a high band of frequencies; generating a plurality of preamble sequences for the one or more bands of frequencies using the sampling frequency clock; detecting preamble sequences received from other devices coupled to the power line for the one or more bands of frequencies using the sampling frequency clock; and postponing data transmission by the device when a preamble from a non-interoperable device is detected, wherein generating the plurality of preamble sequences by the device for the low band of frequencies form a preamble that is similar to a preamble generated by the non-interoperable device.

12. The method of claim 11, wherein generating OFDM symbols is performed using a data sampling frequency Fs/m, where m is an integer, and a fast Fourier transform having length N, whereby interoperability is achieved with other high band devices coupled to the power line that form OFDM symbols using a data sampling frequency Fs and a fast Fourier transform having length N.

13. The method of claim 11, wherein the set of tones used for generating OFDM symbols for the lower band of frequencies is a subset of the set of tones used for the high band of frequencies.

14. The method of claim 11, wherein the preamble sequences for the lower band of frequencies occupy a subset of the set of tones occupied by the preamble sequences of the high band of frequencies.

15. The method of claim 11, further comprising receiving data OFDM symbols at a data bandwidth, wherein detecting a preamble from the high band device is performed on a bandwidth B(preamble-Rx) that is larger than the data bandwidth.

16. A method for communicating digital data over power lines, the method comprising: generating a sampling frequency clock within a device coupled to the power lines; generating orthogonal frequency division multiplexing (OFDM) symbols within the device using a set of tones for at least one band of frequencies; and generating a plurality of preamble sequences for the at least one band using the sampling frequency clock and the set of tones; wherein the tones used for preamble generation have a constant magnitude, and a set of phases obtained by quantizing to a small alphabet a phase of a set of tones obtained by taking an inverse fast Fourier transform (IFFT) of a portion of a preamble used by a non-interoperable powerline access technology, wherein the preamble sequence is detectable by a non-interoperable device coupled to the powerline; and postponing data transmission by the device when a preamble from a non-interoperable device is detected, wherein generating the preamble sequence by the device for the low band forms a preamble that is similar to a preamble generated by the non-interoperable device, such that the preamble detection unit is operable to detect a preamble from another interoperable device and also from the non-interoperable device.

17. A method for communicating digital data over power lines, the method comprising: generating a sampling frequency clock within a device coupled to the power lines; generating orthogonal frequency division multiplexing (OFDM) symbols within the device using a set of tones for at least one band of frequencies; and generating a plurality of preamble sequences for the at least one band using the sampling frequency clock and the set of tones; wherein the tones used for preamble generation have a constant magnitude, and a set of phases obtained by quantizing to a small alphabet a phase of a set of tones obtained by taking an inverse fast Fourier transform (IFFT) of a portion of a preamble used by a non-interoperable powerline access technology, wherein the preamble sequence is detectable by a non-interoperable device coupled to the powerline, wherein generating a preamble for the at least one band is performed according to $$S_{Preamble\_LB}[n] S_{SYNC\_LB}[(n) \bmod 512] \text{ for } 0 \le n \le 2 \cdot 512 - 1.$$

18. The method of claim 17, wherein $$S_{SYNC\_LB}[n] = \frac{1}{\sqrt{512}} \cdot \sum_{c \in C_M} \cos\left(\frac{2 \cdot \pi \cdot c \cdot n}{512} + \phi(c)\right) \text{for } 0 \le n \le 512 - 1$$

where c is an active carrier and $C_M$ is the set of all active carriers in the low band and the angle $\phi(c)$ denotes the phase of the IFFT computed on the portion of the preamble, quantized in steps of pi/4.

* * * * *